(12) United States Patent
Claes

(10) Patent No.: US 10,323,981 B2
(45) Date of Patent: Jun. 18, 2019

(54) COMPACT INTERFEROMETER

(71) Applicants: IMEC VZW, Leuven (BE); Samsung Electronics Co. Ltd., Gyeonggi-do (KR)

(72) Inventor: Tom Claes, Merelbeke (BE)

(73) Assignees: IMEC VZW, Leuven (BE); SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 15/569,879

(22) PCT Filed: Apr. 28, 2016

(86) PCT No.: PCT/EP2016/059472
§ 371 (c)(1),
(2) Date: Oct. 27, 2017

(87) PCT Pub. No.: WO2016/174127
PCT Pub. Date: Nov. 3, 2016

(65) Prior Publication Data
US 2018/0106671 A1    Apr. 19, 2018

(30) Foreign Application Priority Data
Apr. 28, 2015 (EP) .................................. 15165296

(51) Int. Cl.
*G01B 9/02* (2006.01)
*G01J 3/02* (2006.01)
(Continued)

(52) U.S. Cl.
CPC ........ *G01J 3/0218* (2013.01); *G01B 9/02015* (2013.01); *G01B 9/02083* (2013.01);
(Continued)

(58) Field of Classification Search
CPC .... G01J 3/4532; G01J 3/4531; G01B 9/02051
See application file for complete search history.

(56) References Cited

U.S. PATENT DOCUMENTS 6,421,482 B1 *   7/2002   Augustsson .......... G02B 6/122
                                                              385/129
10,036,853 B1 *  7/2018   Lin .................... G02B 6/29344
(Continued)

FOREIGN PATENT DOCUMENTS

WO        2012/015995 A2      2/2012

OTHER PUBLICATIONS

PCT Search Report and Written Opinion, PCT International Application No. PCT/EP2016/059472, dated Jul. 28, 2016, 13 pages.
(Continued)

*Primary Examiner* — Shawn Decenzo
(74) *Attorney, Agent, or Firm* — McDonnell Boehnen Hulbert & Berghoff LLP

(57) ABSTRACT

An example embodiment may include an interferometer. The interferometer may include a multimode waveguide with an input waveguide optically coupled to a first side of the multimode waveguide, for feeding a light signal to the multimode waveguide. The interferometer may also include a first waveguide at one end optically coupled to a second side of the multimode waveguide, and at the other end terminated by a first waveguide mirror. The interferometer may also include a second waveguide at one end optically coupled to the second side of the multimode waveguide and at the other end terminated by a second waveguide mirror. The multimode waveguide may be adapted to distribute the light signal towards the first and second waveguide mirror via the first waveguide and via the second waveguide.

9 Claims, 4 Drawing Sheets

(51) Int. Cl.
*G01J 3/44* (2006.01)
*G01J 3/453* (2006.01)
*G02B 6/293* (2006.01)

(52) U.S. Cl.
CPC ............. *G01J 3/021* (2013.01); *G01J 3/0259* (2013.01); *G01J 3/44* (2013.01); *G01J 3/4531* (2013.01); *G02B 6/29346* (2013.01); *G02B 6/29349* (2013.01)

(56) References Cited

U.S. PATENT DOCUMENTS

| | | | | |
|---|---|---|---|---|
| 2003/0091287 A1* | 5/2003 | Lam | ....................... | B82Y 20/00 385/40 |
| 2004/0150830 A1* | 8/2004 | Chan | ..................... | G01J 3/4535 356/479 |
| 2004/0151436 A1 | 8/2004 | Chan | | |
| 2007/0110363 A1* | 5/2007 | Miyadera | ............. | G02B 6/2813 385/27 |
| 2011/0116735 A1* | 5/2011 | Baets | ..................... | G01D 5/268 385/12 |
| 2011/0149381 A1* | 6/2011 | Hatakeyama | ......... | H01S 5/0655 359/341.1 |
| 2013/0028557 A1* | 1/2013 | Lee | ........................ | G02B 6/105 385/28 |
| 2014/0375999 A1* | 12/2014 | Okamoto | ............... | G01J 3/4531 356/451 |
| 2015/0277072 A1* | 10/2015 | Hatori | .................. | G02B 6/4207 385/14 |
| 2016/0294158 A1* | 10/2016 | Chen | ..................... | H01S 5/1007 |
| 2018/0164506 A1* | 6/2018 | Painchaud | ........... | G02B 6/2813 |
| 2018/0172906 A1* | 6/2018 | Rothberg | ............... | G01M 11/35 |

OTHER PUBLICATIONS

Teichmann, Helmut, "Integrated Optical Sensors: New Developments", Micro and Nanosensor Technology / Trends in Sensor Markets; Sensors—a Comprehensive Survey, Jan. 1, 1995, pp. 221-258.

* cited by examiner

COMPACT INTERFEROMETER

CROSS-REFERENCE TO RELATED APPLICATION

The present application is a national stage entry of PCT/EP2016/059472 filed Apr. 28, 2016, which claims priority to European Patent Application No. 15165296.3 filed Apr. 28, 2015, the contents of which are hereby incorporated by reference.

FIELD OF THE DISCLOSURE

The disclosure relates to the field of photonic circuits. More specifically it relates to the field of interferometers and the use thereof in a spectrometer.

BACKGROUND

Many photonic circuits include interferometers or resonators, for example, to provide a periodic transmission spectrum for spectroscopy. Spectroscopy may, for example, be used for identifying molecules. Thereby vibrational information which is specific to the chemical bonds and to the symmetry of the molecules may be studied.

For spectrometer applications, the interferometer size may be small. Many of the typical interferometer components contain waveguide bends. These waveguide bends are introduced to create a path length difference between a first waveguide and a second waveguide of the interferometer. The presence of the waveguide bends can be very space consuming.

An example of such an interferometer is a Mach-Zehnder interferometer. Such an interferometer outputs a sinusoidal transmission as a function of wavelength. The sinusoidal transmission of a Mach-Zehnder interferometer is desired for many applications. The Mach-Zehnder interferometer itself is, however, is a very space-consuming device.

Another example of an interferometer is a ring resonator. Such a resonator gives Lorentzian shaped resonances. Ring resonators consume a lot of space in most material systems.

Yet another example interferometer is a Fabry-Perot resonator. The transmission spectrum of a Fabry-Perot resonator gives Lorentzian resonances. Fabry-Perot resonators can be made in a more compact form factor.

US2004/151436 discloses a scannable mirror arrangement for an interferometer. The interferometer in US2004/151436 comprises a scannable mirror moveable in an optical waveguide. The optical waveguide may be fluid filled and the mirror may be moved by an electromagnetic or electrostatic motor.

WO2012/015995 discloses a transform spectrometer measurement apparatus and a method for a planar waveguide circuit including phase shifting for error correction. The spectrometer typically includes an input optical signal waveguide carrying an input optical signal; a plurality of couplers, each connected to the input optical signal waveguide, and each including a coupler output for carrying a coupled optical signal related to the input optical signal; and an array of interleaved, waveguide Mach-Zender interferometers (MZI), each having at least one input MZI waveguide, each MZI input waveguide receiving a coupled optical signal from a respective coupler output.

Design parameters for an interferometer may include the size of the interferometer and the transmission, which may be predictable for different production runs. In view of the example interferometers described above, which either do not have a compact form factor or do not have a predictable sinusoidal transmission as a function of wavelength, there is still room for improved interferometers.

SUMMARY

Some embodiments of the present disclosure provide a compact, reliable multimode interferometer.

This may be accomplished by a method and device according to some example embodiments.

In a first aspect, some example embodiments relate to an interferometer comprising: a multimode waveguide; an input waveguide optically coupled to a first side of the multimode waveguide, for feeding a light signal to the multimode waveguide; a first waveguide at one end optically coupled to a second side of the multimode waveguide, and at the other end terminated by a first waveguide mirror; a second waveguide at one end optically coupled to the second side of the multimode waveguide and at the other end terminated by a second waveguide mirror, or a second waveguide mirror directly optically coupled to the second side of the multimode waveguide. In such an interferometer, the multimode waveguide may be adapted to distribute the light signal towards the first and second waveguide mirror via the first waveguide and, if present, via the second waveguide. The interferometer comprises at least one signal readout structure partly or completely integrated in the multimode waveguide and positioned for receiving reflected light from the first and/or second waveguide mirrors with a power that depends on the phase difference between the two reflected waves.

In some embodiments, the area of the interferometer can be reduced by making bidirectional use of the first and second waveguide, and the multimode waveguide. This is enabled by the first and second waveguide mirror at the end of the first and second waveguides. Therefore, only half of the length of the first and second waveguide are used. In some embodiments, the input path and the output path are separated. This is enabled by a readout structure on the multimode waveguide. In some embodiments, the readout structure is integrated in the interferometer, thereby reducing the losses which would occur if a separate component would be used for outputting the signal. In some interferometers, it might for example still be required to separate the input from the output signal. In some embodiments, no curb (waveguide bend) is necessary in the first waveguide or in the second waveguide. This allows for an interferometer which has a more compact size than a Mach-Zehnder interferometer, but which has a similar sinusoidal transmission as a function of the wavelength. Some embodiments provide for a sinusoidal transmission spectrum that is more predictable than, for example, the Lorentzian resonances/interferences of a ring resonator. The transmission spectrum of a resonator is sensitive for variations in the fabrication of the resonator. These variations may cause changes in the amplitude and width of the peaks of the transmission spectrum. Interferometers with a sinusoidal transmission spectrum are moreover more sensitive to incoming light than for example resonator based interferometers.

The at least one signal readout structure of the interferometer may be positioned such that for a selected wavelength range of the light signal, the reflected light concentrates on the signal readout structure with a power that depends on the phase difference between the two reflected waves.

In some embodiments, the readout structure can be positioned such that it does not enlarge the area of the interferometer. This can be done by positioning the readout structure on a place of the multimode waveguide which is free and not used for in coupling light.

The first and/or second waveguide mirror of the interferometer may be Bragg reflectors. Bragg reflectors may be easy to produce.

In alternative embodiments, the first and/or second waveguide mirror of the interferometer may be metal mirrors. Metal mirrors may provide a bandwidth higher than the bandwidth of, for example, a Bragg reflector.

In some embodiments, the at least one signal readout structure of the interferometer may comprise a first readout structure and a second readout structure positioned such that reflected light concentrates on both readout structures with a power that depends on the phase difference between the two reflected waves. In some embodiments, the first readout structure and the second readout structure may be positioned on these places where the reflected light concentrates if the reflected wave of the first wave guide is 180° out-of-phase with the reflected wave of the second waveguide. In some embodiments, the concentrated light on both sides of the input waveguide is read out.

The readout structure of the interferometer may comprise a light signal output coupler. In some embodiments, the concentrated light may be coupled out of the interferometer such that it can be detected outside the interferometer. In some embodiments, the output coupling may be done in a direction orthogonal to the area of the interferometer. This allows for the positioning of a second plane of detectors parallel with a first plane of interferometers. The light signal output coupler of the interferometer may be a grating coupler.

The interferometer may comprise a reflector for improving the directivity of the output coupler. This way, more light may be directed towards the detector.

The readout structure of the interferometer may comprise a photodetector. The photodetector may be integrated in the multimode waveguide to directly detect light impinging onto it, or it may be implemented so as to capture light redirected and coupled out by the output coupler. In some embodiments, the readout structure of the photodetector may be a photodiode.

In a second aspect, some embodiments relate to a spectrometer chip comprising a plurality of interferometers.

Some embodiments provide that for a specific spectrometer size, the number of interferometers can be higher than when using Mach-Zehnder interferometers because of the reduced size of an interferometer according to the embodiments disclosed herein. By increasing the number of interferometers on a spectrometer chip, the optical throughput (etendue) of the spectrometer can be increased.

Alternatively, some embodiments provide that for a specific spectrometer size, interferometers with a larger path length difference can be incorporated compared to when Mach-Zehnder interferometers would be used. By increasing the path length difference of interferometers in the spectrometers, the spectral resolution of the spectrometer improves.

The interferometers in the spectrometer chip may be laid out in a staggered way, whereby a first interferometer and a second interferometer are facing each other with their input waveguides on opposite sides and a first waveguide of the first interferometer facing a second waveguide of the second interferometer, and vice versa. In some embodiments, the size of the spectrometer chip can be reduced by staggering the interferometers. In some embodiments, no curb is necessary in the first or second waveguide. This results in a form of the interferometers which allows to position the interferometers optimally in view of the occupied area of the interferometers. The form of the interferometers allows to stagger the plurality of interferometers, thereby obtaining a more compact spectrometer chip. This is, for example, not possible with the more complex form of a Mach-Zehnder interferometer.

In a third aspect, some embodiments relate to the use of a spectrometer chip for determining the Raman spectrum of a molecule. Some embodiments allow for a high optical throughput to be obtained (a high etendue). The etendue of the spectrometer may depend, at least in part, on the number of interferometers. This number can be increased because of the reduced size of the interferometers, compared to Mach-Zender interferometers. Some embodiments allow for a high resolution Raman spectrum of a molecule to be obtained. The resolution of the spectrometer chip depends on the number of interferometers used, and on the maximal path length difference of the interferometers. The high density of interferometers on a spectrometer chip allows for the increase of the number of interferometers in comparison with other interferometers. The increased number of interferometers results in a Raman spectrum with a finer resolution. The Raman spectrum reveals the structure of a molecule. A finer resolved Raman spectrum therefore results in a more accurate structure of the molecule.

Some aspects of the disclosure are set out in the accompanying independent and dependent claims. Features from the dependent claims may be combined with features of the independent claims and with features of other dependent claims as appropriate and not merely as explicitly set out in the claims.

These and other aspects of the disclosure will be apparent from and elucidated with reference to the embodiment(s) described hereinafter.

Figure 1:
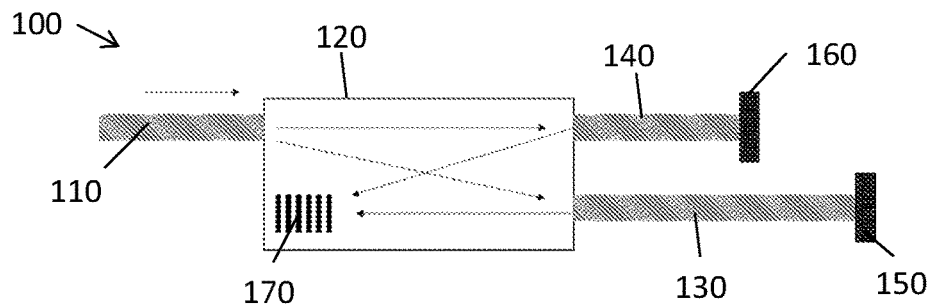
FIG. 1 schematically illustrates a top view of a multimode interferometer, comprising a grating, according to an example embodiment.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION

The present disclosure will be described with respect to particular embodiments and with reference to certain drawings. However, the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the disclosure.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the example embodiments described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the example embodiments described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, in one or more embodiments.

Similarly it should be appreciated that in the description of some embodiments, various features are sometimes grouped together in a single embodiment, figure, or description thereof for the purpose of streamlining the disclosure and aiding in the understanding of one or more of the various aspects. This method of disclosure, however, is not to be interpreted as reflecting an intention that the example embodiments require more features than are expressly recited in each claim. Rather, as the following claims reflect, various aspects lie in less than all features of a single foregoing disclosed embodiment. Thus, the claims following the detailed description are hereby expressly incorporated into this detailed description, with each claim standing on its own as a separate embodiment.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that some embodiments may be practiced without these specific details. In other instances, well-known methods, structures and techniques have not been shown in detail in order not to obscure an understanding of this description.

Figure 2:
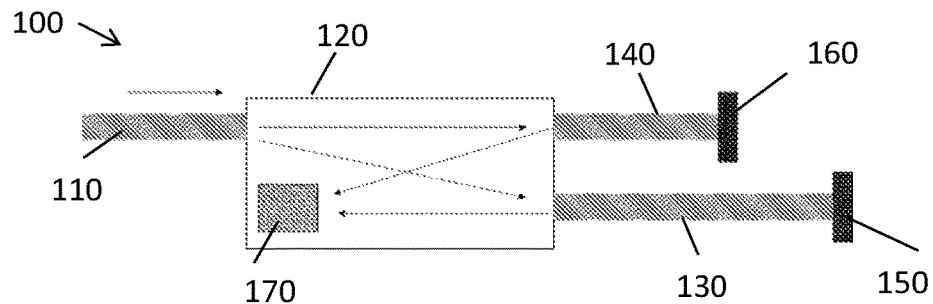
FIG. 2 schematically illustrates a top view of a multimode interferometer, comprising a photodiode, according to an example embodiment.

In a first aspect the present disclosure relates to a multimode interferometer 100. The multimode interferometer may for example be used as a Michelson interferometer. The concept thereof is schematically illustrated in FIG. 1, and another exemplary embodiment is illustrated in FIG. 2. The multimode interferometer 100 comprises an input waveguide 110 which is coupled to a multimode waveguide 120 at a first side thereof. The positioning of the input waveguide 110 at the first side of the multimode waveguide 120 is not restricted to the positioning as shown in the pictures. The input waveguide 110 may for example also be positioned in the center of the first side of the multimode waveguide 120. Although depicted as a rectangular waveguide, the multimode waveguide 120 may also have any other suitable shape in cross-section. The multimode waveguide 120 is coupled to a first waveguide 130 at a second side opposite to the first side, and terminated by a first waveguide mirror 150. The multimode waveguide 120 is either coupled to a second waveguide 140, at a second side opposite to the first side, and terminated by a second waveguide mirror 160 or the multimode waveguide 120 is directly coupled to the second waveguide mirror 160. The second case corresponds with the virtual situation that a zero length is chosen for the second waveguide 140. The embodiments disclosed hereinafter may have a second waveguide 140 of zero length, corresponding with the absence of the second waveguide 140 and a direct optical coupling between the second waveguide mirror 160 and the multimode waveguide 120. In that case the second waveguide mirror 160 is put coinciding with the second side of the multimode waveguide 120 which results in a very compact implementation of the multimode interferometer 100.

The mirrors 150, 160 may for instance be metal mirrors or reflective structures such as e.g. Bragg reflectors. The mirrors 150, 160 are preferably wideband mirrors. The multimode interferometer 100 is configured such that, if light is coupled into the input waveguide 110, it is distributed by the multimode waveguide 120 into a first wave in the first waveguide 130 and a second wave in the second waveguide 140, after which the waves are reflected by the first and second waveguide mirror 150, 160, respectively, back in the first and second waveguide 130, 140, and back into the multimode waveguide 120. The multimode waveguide 120 may be adapted to equally distribute the light signal towards the first 150 and second 160 waveguide mirror. The multimode waveguide 120 lies in a plane. The input waveguide 110 and the first and second waveguides 130, 140 each also may lie in a plane, for instance the same plane or a plane parallel to the plane of the multimode waveguide. A signal readout structure 170 is positioned on an appropriate place on the multimode waveguide 120. The signal readout structure 170 may be partly or completely integrated in the multimode waveguide 130 or it may even lay outside the multimode waveguide 130 (e.g. protruding out of the multimode waveguide 120). In some embodiments, the readout structure is located closer to the first side of the multimode waveguide 120 than to the second side of the multimode waveguide 120. The appropriate place of the readout structure is selected such that, depending on the wavelength, interfering light of the reflected first wave and of the reflected second wave concentrate on that place. By positioning the readout structure on that place, the light can be read out by the signal readout structure 170. The signal readout structure 170 may be an output coupler such as for example a grating coupler as illustrated in FIG. 1, which may out-couple captured reflected light out of the multimode waveguide 120, for instance in a direction angled with respect to, e.g. perpendicular to, the plane of the multimode waveguide 120. The signal readout structure 170 may also be a photodiode for detecting impinging radiation and converting this into an electrical signal. An example of a multimode interferometer 100 comprising a photodiode as signal readout structure 170 is illustrated in FIG. 2.

In some embodiments, the length of the first waveguide 130 is different from the length of the second waveguide 140. In some embodiments, as stated above, one of the waveguides may have zero length, such that there is a direct optical coupling between the second waveguide mirror 160 and the multimode waveguide 120. An embodiment with first and second waveguides 130, 140 having a different, but both non-zero length, is illustrated in FIG. 1 and FIG. 2, and a particular example thereof is illustrated by a 3D-drawing in FIG. 3. In these embodiments, the path length of a first wave travelling the first waveguide 130 is different from the path length of a second wave travelling the second waveguide 140 This causes a phase difference between the two reflected waves injected from the first and second waveguides 130, 140, respectively, into the multimode waveguide 120, which phase difference is wavelength dependent. The amount of light that is coupled to the signal readout structure 170 depends on the phase difference between the first wave and the second wave. If there is a path length difference in the multimode waveguide 120 already, e.g. because the input waveguide 110 is not provided at the center of the first side of the multimode waveguide 120, and hence the paths to the first and second waveguides 130, 140 are different, then this path length difference should be taken into account when, during design, determining the required length of the first and second waveguides 130, 140.

When the reflected wave coupled out of the first waveguide 130 into the multimode waveguide 120 at a second side is in phase with the reflected wave coupled out of the second waveguide 140 into the same multimode waveguide 120 at the second side, light will couple again to the input waveguide 110 at a first side opposite the second side if the input waveguide is positioned in the center of the first side compared to the positioning of the first 130 and second 140 waveguide at the second side. However, if the reflected light wave coupled out of the first waveguide 130 into the multimode waveguide 120 at the second side is completely out-of-phase (phase difference of 180°) with the reflected wave coupled out of the second waveguide 140 into the multimode waveguide 120 at the second side, light will concentrate at another location than the input waveguide 110 at the first side of the multimode waveguide 120. The location where light concentrates depends on the position of the input waveguide 110 and the shape and dimensions of the multimode waveguide 120. In some embodiments, as for instance illustrated in FIG. 3 and FIG. 4, the input waveguide 110 may couple to the multimode waveguide 120 substantially at the middle of the first side thereof, and light may concentrate adjacent the location where the input waveguide 110 couples to the multimode waveguide 120, on each side of the input waveguide 110. In other embodiments, for example in the case of an asymmetric situation as in FIG. 1 or FIG. 2 (where the input waveguide is not centered at the first side compared to the positioning of the first 130 and second 140 waveguides at the second side), the following relationship exists:

when the phase difference at the second side of the multimode waveguide 120 after reflection is the same as the phase difference at the second side of the multimode waveguide before reflection, the light will go back to the input waveguide 110, when the phase difference at the second side of the multimode waveguide after reflection has shifted π radians compared to the phase difference at the second side of the multimode waveguide before reflection, the light will go to the readout structure, where the signal readout structure is positioned accordingly. In such alternative embodiments, as for instance illustrated in FIG. 1 and FIG. 2, the input waveguide 110 may couple to the multimode waveguide 120 off-center, and light may concentrate adjacent the location where the input waveguide 110 couples to the multimode waveguide 120, at a free portion on the first side of the multimode waveguide 120. The light that concentrates next to the input waveguide 110 can then be collected and coupled to one or more detectors, for example (but not limited thereto) by using photodiodes or by using grating couplers 170, 320 that diffract light in the direction of the detector(s). An example embodiment of a multimode interferometer 100 comprising a first grating coupler 170 and a second grating coupler 320 next to the input waveguide 110 is illustrated in FIG. 3.

In some embodiments, the signal readout structure 170 couples the reflected light to an output different from the input waveguide 110.

Figure 3:
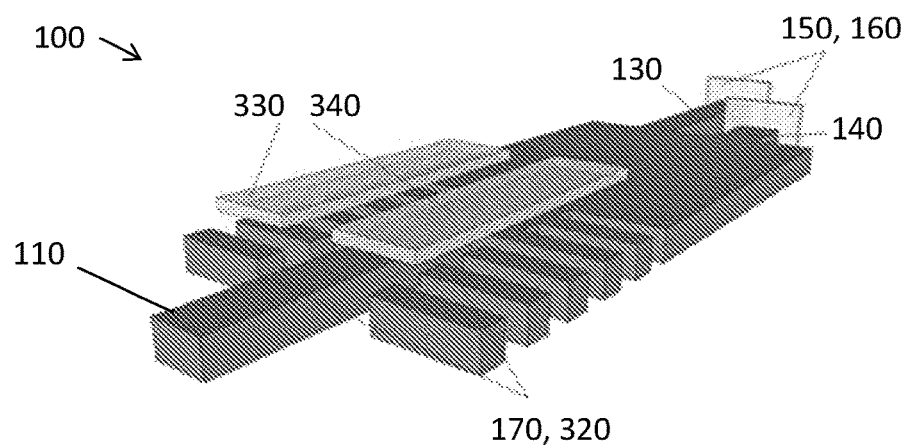
FIG. 3 is a 3D-view of a multimode interferometer, according to an example embodiment.

The example embodiment illustrated in FIG. 3 comprises a first signal readout structure 170 and a second coupler 320 next to the input waveguide 110. The light is coupled into the first signal readout structure 170 and the second readout structure 320 whereby the amount of light that is coupled to the signal readout structures 170, 320, depends on the phase difference between the first wave having a first phase and the second wave having a second phase.

The signal readout structure 170, 320 may comprise at least one output coupler, for example, but not limited thereto, at least one grating coupler or a photonic antenna or an angled mirror, that reflects light towards one or more detectors. In some embodiments, one or more detectors are positioned so as to detect the light that is coupled out by the one or more output couplers 170, 320. In the exemplary embodiment illustrated in FIG. 3 the detector may for example be positioned underneath the multimode interferometer 100. In some embodiments, a reflector 330, 340 is combined with a grating coupler 170, 320 for improving the directivity of the grating coupler 170, 320. In the example illustrated in FIG. 3 a first reflector 330 is associated with the first grating coupler 170 and a second reflector 340 is associated with the second grating coupler 320. The reflectors 330, 340 are thereby positioned above the grating couplers 170, 320 whereas the detector is positioned underneath the grating couplers 170, 320. The indication "above" and "underneath" is not intended to be binding, and also other configurations are envisaged; for instance the one or more reflectors may be located below the one or more grating couplers and the one or more detectors may be located above the one or more grating couplers. Use of at least one reflector improves the directivity of the grating coupler 170, 320 in the direction of the detector.

In some embodiments, the waveguide mirror 150, 160 at the end of the first and second waveguides 130, 140 may be a metal mirror. This metal mirror is oriented orthogonally to the chip substrate and orthogonally to the associated waveguide 130, 140. In some embodiments, the metal mirror may have a bandwidth between 400 nm and 600 nm, for example 500 nm.

In alternative embodiments, the waveguide mirror 150, 160 may be a waveguide with periodic structure (e.g. a Bragg reflector). The bandwidth of such a Bragg reflector may be between 50 nm and 100 nm, for example 100 nm. Such a Bragg reflector is easier to produce than a vertical metal mirror.

Figure 4:
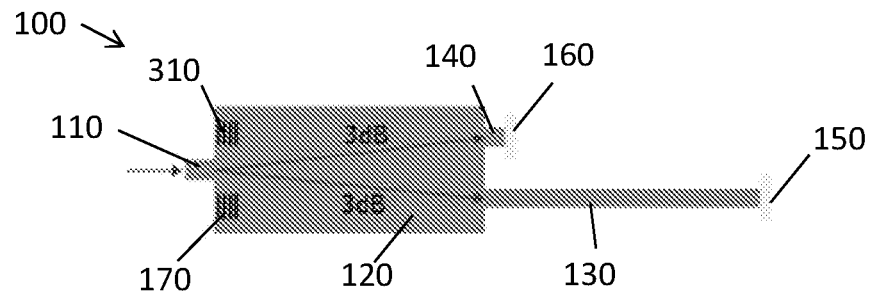
FIG. 4 shows an incoming wave split into two optical waves in a multimode interferometer, according to an example embodiment.
Figure 5:
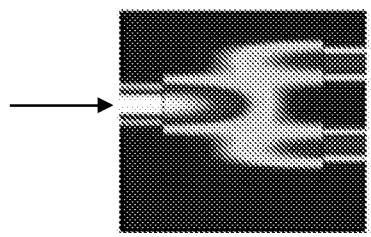
FIG. 5 shows the power distribution of the forward propagating component of the light in the situation corresponding with FIG. 4.

In some embodiments, the input light is equally split over the first waveguide 130 and the second waveguide 140. An example thereof is illustrated in FIG. 4. FIG. 5 shows the corresponding power distribution of the light in the input waveguide 110, in the multimode waveguide 120, in the first waveguide 130, and in the second waveguide 140, for the forward propagating component separately.

The difference in length between the first waveguide 130 and the second waveguide 140 causes a wavelength-dependent phase difference between the reflected light in the first waveguide 130 and the reflected light in the second waveguide 140.

Figure 6:
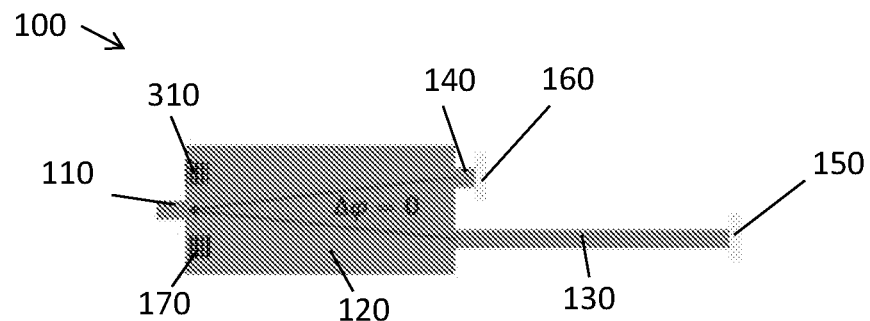
FIG. 6 shows two reflected waves which are in phase, in a multimode interferometer, according to an example embodiment.
Figure 7:
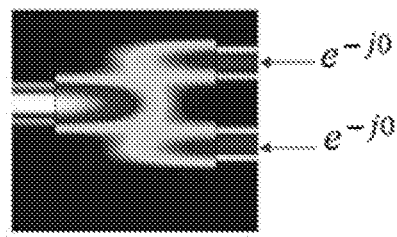
FIG. 7 shows the power distribution of the backward propagating component of the light in the situation corresponding with FIG. 6.

FIG. 6 and FIG. 7 show the situation where no phase difference is present. As can be seen in FIG. 7 the light is reflected back into the input wave guide 110. FIG. 7 shows the backward propagating component separately for the case of FIG. 6. As can be seen on FIG. 7, no light power is present in the areas of the first grating coupler 170 and the second grating coupler 320, and light power is present on the position of the input waveguide 110.

Figure 8:
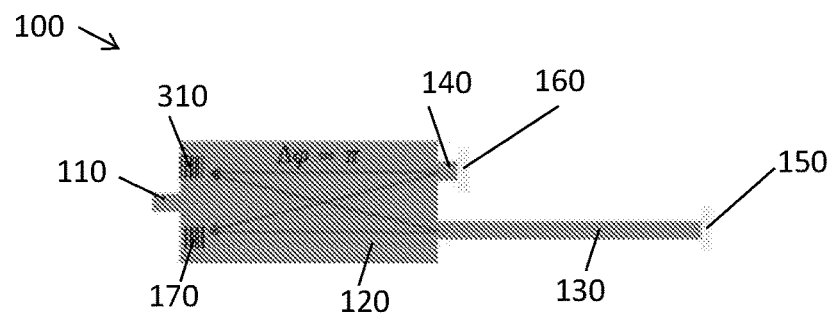
FIG. 8 shows two reflected waves which are out-of-phase, in a multimode interferometer, according to an example embodiment.
Figure 9:
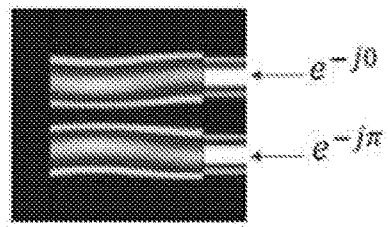
FIG. 9 shows the power distribution of the backward propagating component of the light in the situation corresponding with FIG. 8.

FIG. 8 and FIG. 9 show the situation where the phase difference between the reflected wave in the first waveguide 130 an the reflected wave in the second waveguide 140 equals 180°. FIG. 9 shows the backward propagating component separately for the case of FIG. 8. As can be seen in FIG. 9 the light power is present in the areas of the first grating coupler 170 and the second grating coupler 320. The light is therefore, in this situation, coupled to the first grating coupler 170 and to the second grating coupler 320.

Figure 10:
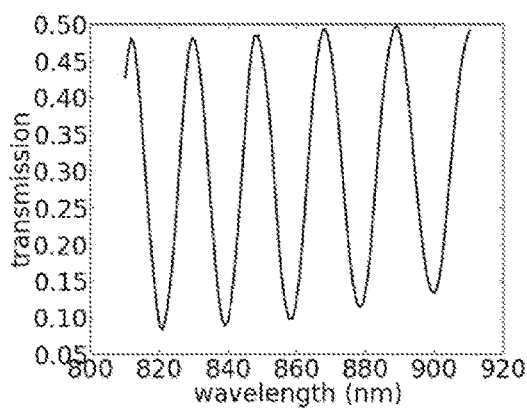
FIG. 10 shows the transmission spectrum of a multimode interferometer, according to an example embodiment.

In some embodiments, the transmission spectrum of the multimode interferometer 100 is a sinusoidal transmission spectrum (e.g. a cost transmission spectrum). FIG. 10 shows a simulated transmission as a function of wavelength for a multimode interferometer 100. The wavelength is thereby expressed in nm. It can be seen from this graph that the multimode interferometer 100 can generate interference fringes. This allows some embodiments to generate interference fringes which are comparable with the interference fringes of a Mach-Zehnder interferometer but that the form factor of the multimode interferometer 100 is smaller than the form factor of the Mach-Zehnder interferometer.

Figure 11:
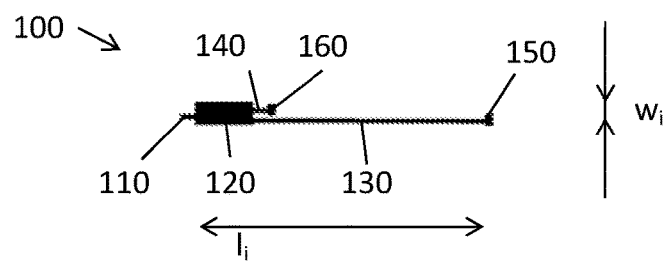
FIG. 11 shows a schematic drawing of a multimode interferometer, according to an example embodiment.
Figure 12:
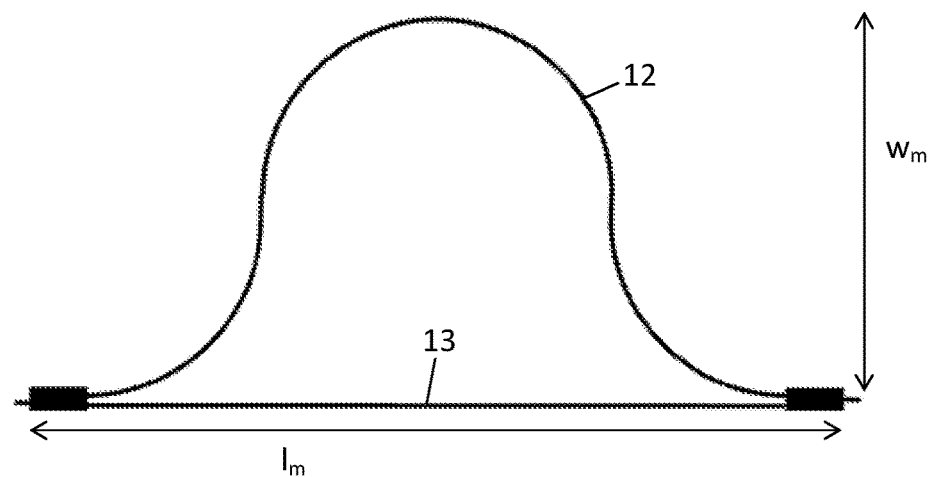
FIG. 12 schematically illustrates a Mach-Zehnder multimode interferometer.

FIG. 11 is a schematic drawing of a multimode interferometer 100, according to an example embodiment. FIG. 12 schematically illustrates, for comparison reasons, a Mach-Zehnder multimode interferometer. In this interferometer the first waveguide 12 is longer than the second waveguide 13. To obtain this difference in waveguide length, curbs are introduced in the longer one 12 of the waveguides. The radius of these curbs should not be below a minimal radius in order to prevent the loss of light power. The minimal radius depends on the material system and type of waveguide. This can range from a few micrometers (material system with high refractive index contrast, such as silicon-on-insulator), 10 μm-50 μm (medium index contrast, for example silicon nitride), and all the way up to a few millimeters (for low index contrast material systems, for example glass waveguides). Therefore the area of this interferometer is significantly larger than the interferometer illustrated in FIG. 11. The difference in path length between the first and the second waveguide, however, is similar. Thus, some embodiments allow for the required area for a multimode interferometer 100 is to be smaller than the area occupied by a interferometer which has a same path length difference. For example, in the exemplary interferometer in FIG. 11 the length $l_i$ is equal to 26 μm and the width $w_i$ is equal to 2 μm. In the Mach-Zehnder interferometer of FIG. 12 the length $l_m$ is equal to 70 μm and the width $w_m$ is equal to 33 μm.

The multimode interferometer 100 may be built on any suitable substrate, for instance on a silicon nitride photonics platform.

In a second aspect the present disclosure relates to a spectrometer chip comprising a plurality of multimode interferometers 100. In some spectrometers, the path length difference between the first waveguide and the second waveguide is changed gradually while measuring. An on-chip multimode interferometer of which the path length difference can be changed while measuring is difficult to achieve. This requirement might be avoided in a spectrometer as described in the example embodiments. This spectrometer chip comprises a plurality of multimode interferometers 100. The path length difference between the first waveguide 130 and the second waveguide 140 is different for the different multimode interferometers 100 on the spectrometer chip. The sinusoidal transmission function is therefore different for the different multimode interferometers 100. Therefore parallel scanning with different sinusoidal transmission functions becomes possible. By reducing the size of a multimode interferometer 100 it is possible to increase the number of multimodal interferometers 100 if the area of the spectrometer chip is constant. By combining the measurements of the plurality of multimode interferometers 100, which have different transmission spectra, the spectrum of the light incoming into the spectrometer chip can be determined. Fourier transform analysis can be done on the received signals. The number of multimode interferometers on a spectrometer chip may for example be between 500.000 and 2.000.000, more specifically between 800.000 and 1.200.000, for instance around 1.000.000.

Figure 13:
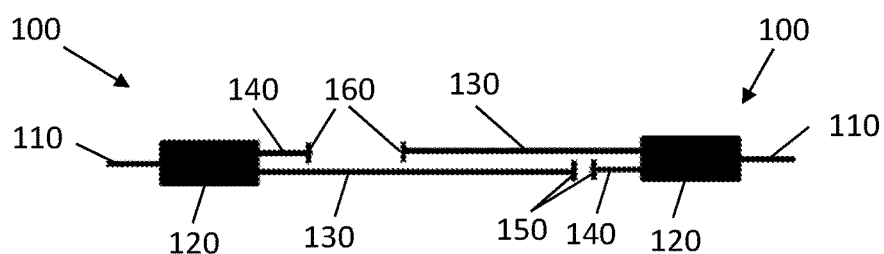
FIG. 13 schematically illustrates a set-up which could be part of a spectrometer chip, according to an example embodiment.

FIG. 13 shows a schematic drawing of what could be a part of a spectrometer chip, according to example embodiments. It shows two interferometers 100 which are staggered. The left interferometer 100 is facing the right interferometer and the input waveguides 110 are on opposite sides. In this figure, the first waveguide 130 of the left interferometer is facing the second waveguide 140 of the right interferometer and the second waveguide 140 of the left interferometer is facing the first waveguide 130 of the right interferometer. By positioning a long waveguide in front of a short waveguide it is possible to minimize the area occupied by the multimode interferometers. In some embodiments, the multimode waveguide 120 of the left interferometer 100 is positioned at a fixed distance from the multimode waveguide 120 of the right interferometer. In these embodiments the sum of lengths of opposing waveguides 130, 140 may be smaller than a predetermined threshold.

In a third aspect, the disclosure relates to the use of a spectrometer chip for determining for instance the Raman spectrum of a molecule.

The invention claimed is:

1. An interferometer comprising:
a multimode waveguide;
an input waveguide optically coupled to a first side of the multimode waveguide, for feeding a light signal to the multimode waveguide;
a first waveguide at one end optically coupled to a second side of the multimode waveguide, and at the other end terminated by a first waveguide mirror; and
a second waveguide at one end optically coupled to the second side of the multimode waveguide and at the other end terminated by a second waveguide mirror,
wherein the multimode waveguide is adapted to distribute the light signal towards the first and second waveguide mirror via the first waveguide and via the second waveguide,
wherein the interferometer comprises at least one grating coupler at least partly integrated in the multimode waveguide and positioned for receiving reflected light from the first and second waveguide mirrors with a power that depends on a phase difference between the two reflected waves,
wherein the at least one grating coupler comprises a first grating coupler and a second grating coupler positioned such that reflected light concentrates on both readout structures with a power that depends on the phase difference between the two reflected waves, and
wherein the first grating coupler and the second grating coupler are respectively positioned on each side of the input waveguide.

2. An interferometer according to claim 1, wherein the at least one grating coupler is positioned such that for a selected wavelength range of the light signal, the reflected light concentrates on the at least one grating coupler with a power that depends on the phase difference between the two reflected waves.

3. An interferometer according to claim 1, wherein the first or second waveguide mirror is a Bragg reflector.

4. An interferometer according to claim 1, wherein the first or second waveguide mirror is a metal mirror.

5. An interferometer according to claim 1, further comprising a reflector for improving the directivity of the grating coupler.

6. An interferometer according to claim 5, wherein the grating coupler comprises a photodetector.

7. An interferometer according to claim 6, wherein the grating coupler comprises a photodiode.

8. A spectrometer chip comprising a plurality of interferometers, wherein at least one of the plurality of interferometers comprises:
a multimode waveguide;
an input waveguide optically coupled to a first side of the multimode waveguide, for feeding a light signal to the multimode waveguide;
a first waveguide at one end optically coupled to a second side of the multimode waveguide, and at the other end terminated by a first waveguide mirror; and
a second waveguide at one end optically coupled to the second side of the multimode waveguide and at the other end terminated by a second waveguide mirror, wherein the multimode waveguide is adapted to distribute the light signal towards the first and second waveguide mirror via the first waveguide and via the second waveguide, and wherein the interferometer comprises at least one grating coupler at least partly integrated in the multimode waveguide and positioned for receiving reflected light from the first and second waveguide mirrors with a power that depends on a phase difference between the two reflected waves, and wherein the plurality of interferometers are in a staggered configuration, wherein a first interferometer and a second interferometer are facing each other with their respective input waveguides on opposite sides and a first waveguide of the first interferometer facing a second waveguide of the second interferometer, and vice versa.

9. The spectrometer chip according to claim 8, wherein the spectrometer chip is configured to determine the Raman spectrum of a molecule.

\* \* \* \* \*